United States Patent
Schleimann-Jensen (10) Patent No.: US 12,372,067 B2
(45) Date of Patent: Jul. 29, 2025

(54) METHOD AND SYSTEM FOR STORING ENERGY

(71) Applicant: The Storing Company AB, Karlsborg (SE)

(72) Inventor: Johan Schleimann-Jensen, Karlsborg (SE)

(73) Assignee: THE STORING COMPANY AB, Karlsborg (SE)

( * ) Notice: Subject to any disclaimer, the term of this patent is extended or adjusted under 35 U.S.C. 154(b) by 0 days.

(21) Appl. No.: 18/861,927

(22) PCT Filed: May 3, 2023

(86) PCT No.: PCT/SE2023/050429
§ 371 (c)(1),
(2) Date: Oct. 31, 2024

(87) PCT Pub. No.: WO2023/214924
PCT Pub. Date: Nov. 9, 2023

(65) Prior Publication Data
US 2025/0109739 A1  Apr. 3, 2025

(30) Foreign Application Priority Data
May 3, 2022  (SE) .................................. 2250543-2

(51) Int. Cl.
*F03G 3/00* (2006.01)
*H02K 7/18* (2006.01)

(52) U.S. Cl.
CPC ........... *F03G 3/094* (2021.08); *H02K 7/1807* (2013.01)

(58) Field of Classification Search
CPC ........ F03G 3/087; F03G 3/094; H02K 7/1807
See application file for complete search history.

(56) References Cited

U.S. PATENT DOCUMENTS 8,674,527 B2 * 3/2014 Fyke ................ H02J 15/00
290/1 R
8,901,758 B1 * 12/2014 Nix ..................... F03G 3/00
290/1 R (Continued)

FOREIGN PATENT DOCUMENTS

CN 103867408 A 6/2014
DE 4135440 A1 * 4/1993 ............... F03G 3/00

(Continued)

OTHER PUBLICATIONS

Swedish Intellectual Property Office, Stockholm, Sweden, Swedish Search Report, Dec. 1, 2022.

(Continued)

*Primary Examiner* — Phillip A Johnson
(74) *Attorney, Agent, or Firm* — Noréns Patentbyrå AB (57) ABSTRACT

System (100) for storing energy in the form of gravitational potential energy, comprising
a plurality of weights (140);
a lower (110) and a higher (120) station, each arranged to receive and hold weights;
a ropeway (130), arranged to transport weights back and forth between said stations, comprising a transport wire (131), an electric motor (132) and an electric generator (133), said weights being arranged to be attached to said transport wire at a station,
the ropeway being arranged to activate the motor to transport said weights between said stations;
the ropeway further being arranged to activate the generator during transport of said weights between said stations while generating electric power.
The invention also relates to a method.

20 Claims, 10 Drawing Sheets

(56) References Cited

U.S. PATENT DOCUMENTS

| | | | |
|---|---|---|---|
| 11,339,765 B2* | 5/2022 | Krasnoff | H02K 7/1853 |
| 2016/0344259 A1* | 11/2016 | Stevens | F03B 17/02 |
| 2020/0109703 A1 | 4/2020 | Bhargava | |
| 2021/0347388 A1* | 11/2021 | Trott | F03G 3/094 |
| 2021/0404446 A1 | 12/2021 | Pedretti et al. | |

FOREIGN PATENT DOCUMENTS

| | | | | |
|---|---|---|---|---|
| WO | WO-2013050343 A2 * | 4/2013 | | F03G 3/00 |
| WO | 2021119765 A1 | 6/2021 | | |

OTHER PUBLICATIONS

Swedish Intellectual Property Office, Stockholm, Sweden, International Search Report, May 31, 2022.
Jan Melin, The first vertical cable car is now being built, Article from Swedish Magazine NY Teknik concerning vertical ropeway, Jan. 27, 2016, https://www.nyteknik.se/populartenik/n-byggs-forsta-vertikala-linbanan-6336367.

* cited by examiner

METHOD AND SYSTEM FOR STORING ENERGY

The present invention relates to a method and a system for storing energy. In particular, the invention relates to using a ropeway for converting and storing electric energy in the form of gravitational potential energy. The invention also relates to the exploitation and use of such stored energy, by converting stored gravitational potential energy to electric energy.

As society undergoes increasing electrification, there is also an increasing need for intermediate storing of electric energy. Many proposals have been put forward in this area.

For instance, the use of batteries, such as based on chemical reactions and phase-transitions, are widely deployed. Batteries are, however, generally associated with a scaling problem. Also, batteries tend to have a limited useful life. They also often use scarce materials that may be expensive and difficult to recycle.

It has also been proposed to store energy chemically in the form of a produced substance that can later be used in a reverse chemical reaction. For instance, hydrogen is widely used as such an intermediate storage substance. This has also proven to be difficult to scale up, and efficiency losses are substantial.

In other examples, hydroelectric solutions are used, whereby water is pumped and led between reservoirs at different heights. Such solutions normally imply large-scale interventions in nature and are normally associated with considerable efficiency losses.

There are other examples of previously proposed solutions, associated with similar problems in terms of environmental impact, cost, scaling difficulties and inefficiencies.

As the reliance on renewable electric energy sources becomes stronger in society, in some regions this also leads to a shortage of quickly regulatable energy production.

The present invention solves at least some of the above described problems, proposing an energy storing solution that is both scalable, energy and cost efficient, robust, reliable and environmentally friendly.

Hence, the invention relates to a system for storing energy in the form of gravitational potential energy, the system comprising a plurality of weights; a first, lower, station arranged to receive and hold weights and a second, higher, station arranged to receive and hold weights; a ropeway, arranged to transport weights back and forth between said first station and said second station, the ropeway comprising a transport wire, an electric motor and an electric generator, said weights being arranged to be attached to said transport wire at said first station, the ropeway being arranged to activate the electric motor to transport said plurality of weights, by transforming an available electric energy into gravitational potential energy of said weights as the weights are transported by the ropeway from the first station to the second station; the ropeway being arranged to transport said plurality of weights in the gravitational field from the second station to the first station by gravity, and to activate the electric generator to transform said potential energy to electric energy.

Moreover, the invention relates to a method for storing energy in the form of gravitational potential energy, the method comprising a first provision step, wherein a plurality of weights are provided, attached to a transport wire of a ropeway at a first station; a first energy conversion step, wherein an electric motor is used to transform available electric energy into potential energy, by displacing said plurality of weights, the weights being conveyed along said ropeway from said first station to a second station, the second station being located higher than the first station, the ropeway being driven by said electric motor and transporting said weights from said first station to said second station; an energy storing step, wherein said weights are held at said second station; and a second energy conversion step, wherein said gravitational potential energy is transformed into electric energy by allowing said weights to move in the gravitational field, while being conveyed along said ropeway from the second station, the potential energy being transformed into electric energy, using an electric generator loaded by the weights.

In the following, the invention will be described in detail, with reference to exemplifying embodiments of the invention and to the enclosed drawings, wherein.

All Figures share reference numerals for same or corresponding parts.

Figure 1:
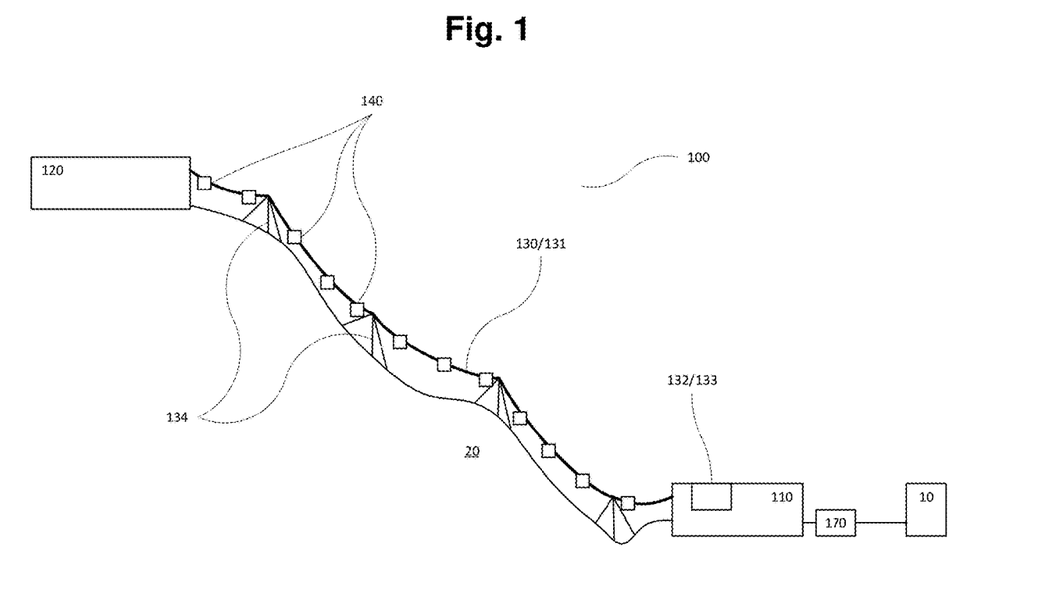
FIG. 1 is a simplified overview of a system as seen from the side.

Hence, FIG. 1 shows a system 100 according to the present invention, the system 100 being specifically adapted for storing energy in the form of gravitational potential energy, and in particular for performing a method according to the present invention. The basic principle used by the present invention, embodied using the system 100 and method described herein, is to use electric energy to lift a plurality of weights 140 from a low point (the below-described first station 110) to a high point (the second station 120), and then to generate electric energy when again lowering said raised weights 140. This raising and lowering takes place using a ropeway 130 that is similar to conventional ropeways arranged to transport persons, but is specifically adapted as will be described hereinbelow.

In FIG. 1, 20 denotes the ground, the contour of which the ropeway 130 follows between stations 110, 120. However, it is realised that the present invention can be implemented anywhere where there is an altitude difference between locations where stations 110, 120 can be arranged having a ropeway 130 of the present type between them.

Thus, the system 100 comprises a plurality of weights 140; a first, lower, station 110; and a second, higher, station 120. The lower station 110 may be arranged at a location being at least 20 meters lower, such as at least 50 meters lower, than the upper station 120 (for instance, as measured from ropeway 130 drive wheel to ropeway 130 drive wheel). In other words, the respective centre of mass of each weight 140 is raised at least 20 meters, such as at least 50 meters, when brought from the first station 110 to the second station 120.

Each of the stations 110, 120 is arranged to receive and hold the weights 140.

As mentioned, the system 100 further comprises the ropeway 130, in turn being arranged to transport the weights 140 back and forth between said first station 110 and said second station 120.

To achieve this, the ropeway 130 comprises a transport wire 131, that may for instance be a per se conventional, suitably dimensioned steel ropeway wire. The transport wire 131 runs between, and is supported by, posts 134 that may be per se conventional ropeway posts, comprising wheels on and past which the transport wire 131 moves.

Figure 6:
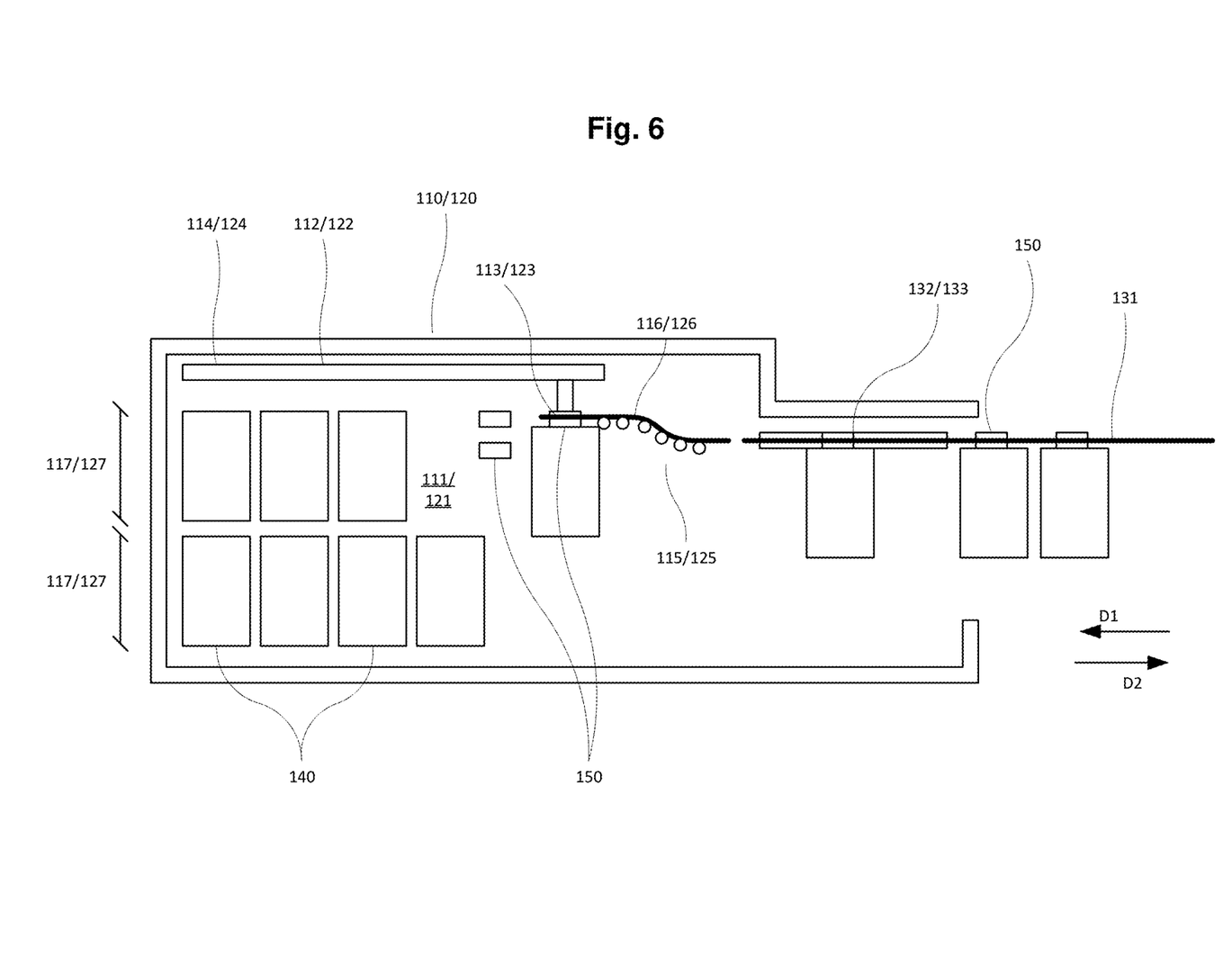
FIG. 6 is a simplified view of a station.

The ropeway 130 also comprises an electric motor 132 and an electric generator 133. FIG. 6 illustrates the case wherein the electric motor 132 and the electric generator 133 is one and the same device, being used as a motor when putting electric energy into the system 100 by agitating the transport wire 131, and as a generator when harvesting electric energy from the system 100 as driven by the transport wire 131.

However, the system 100 may alternatively comprise a separate motor 132 and a separate generator 133, as the case may be. The first station 110 may furthermore comprise several electric motors 132 and/or several electric generators 133, that may be the same or different devices. In some cases, the second station 120 may correspondingly comprise several electric motors 132 and/or several electric generators 133, that may be pairwise be the same or different devices. If any one station 110, 120 comprises more than one motor 132 and/or generator 133, they may be arranged to work in series or in parallel to each other in such station 110, 120.

The or each electric motor 132 may be a DC motor, an AC motor or an asynchronous AC motor. Similarly, the or each electric generator 133 may be a DC generator, an AC generator or an asynchronous AC generator.

It is understood that the system 100 may comprise more than two stations 110, 120, such as one or several intermediate stations, with similar setup.

In particular, the system 100 may be connected to an electric power grid 10, such as a municipal power grid. In this case, it is preferred that the motor 132 and/or generator 133 are provided in a station 110, 120 that is arranged in connection to an electric connection point to said power grid 10.

Furthermore, the system 100 may comprise an electric battery 170 connected to the ropeway 130, and in particular connected to the motor 132 and to the generator 133. Between the motor/generator 132/133 and a main driving/generating wheel of the ropeway 130 there may be a gear mechanism, for achieving a desired rotation speed of the motor/generator 132/133. The battery 170 is then arranged to receive and provide electric energy from and to the ropeway 130 via said connections. The battery 170 may further be arranged to receive and provide electric energy from and to said electric power grid 10. The loading and harvesting of electric energy into and out from the system 100, by raising and lowering the weights 140 and corresponding action by the motor 132 and generator 133, can be performed relatively quickly. Even if the battery 170 is illustrated as connected in series between the station 110 and the grid 10, in FIGS. 1 and 2, it is realized that the battery 170 in practical applications may be connected in parallel (as is illustrated in FIGS. 12*a*-12*c*).

Figure 12A:
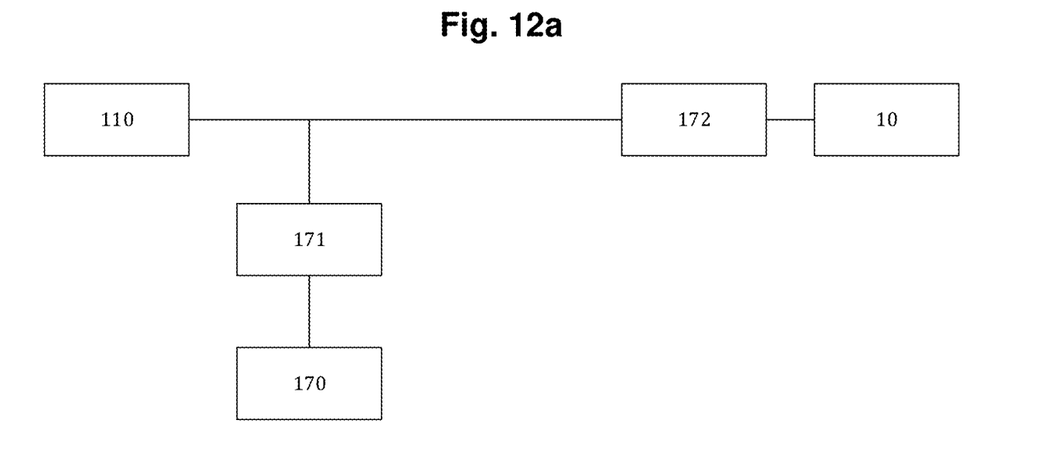
FIGS. 12a-12c are three alternative simplified electric connection diagrams of a station such as the one illustrated in FIG. 7.

As illustrated in FIG. 12*a*, the station 110 ((and/or 120, as the case may be) may be connected, in series, to a transformer 172 and then to the power grid 10. The battery 170 may be connected in parallel thereto, such as between the station 110 and the transformer 172, and further in series with an inverter 171 connected between the battery 170 and the station 110 and/or the transformer 172. This is suitable in case the generator 133 is an AC generator.

Figure 12B:
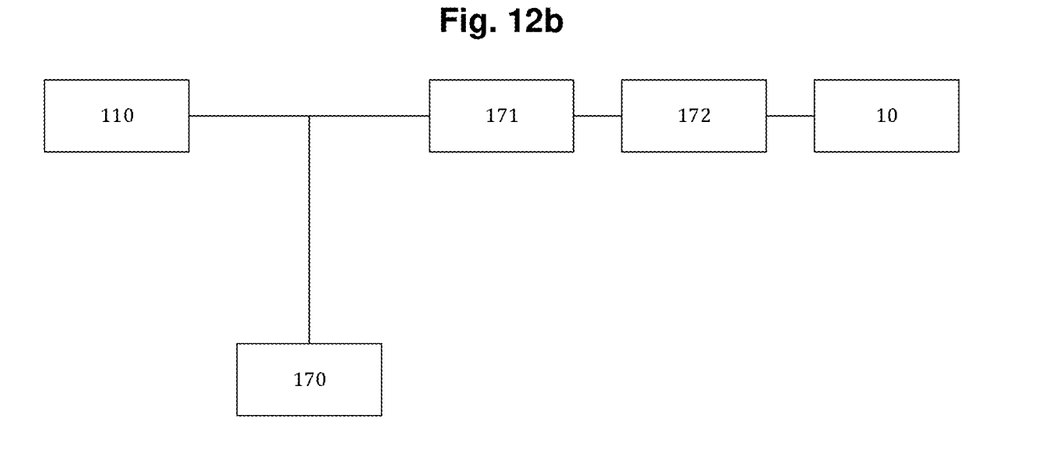

If the generator 133 is instead a DC generator and the battery 170 has a voltage range of operation matched to (such as overlapping with or being the same as) an output voltage range of the generator 133, the setup illustrated in FIG. 12*b* may instead be used, wherein the battery 170 is connected instead in parallel between the station 110 and the inverter 171. In this case, the transformer 172 may be connected in series with and between the inverter 171 and the grid 10.

Figure 12C:
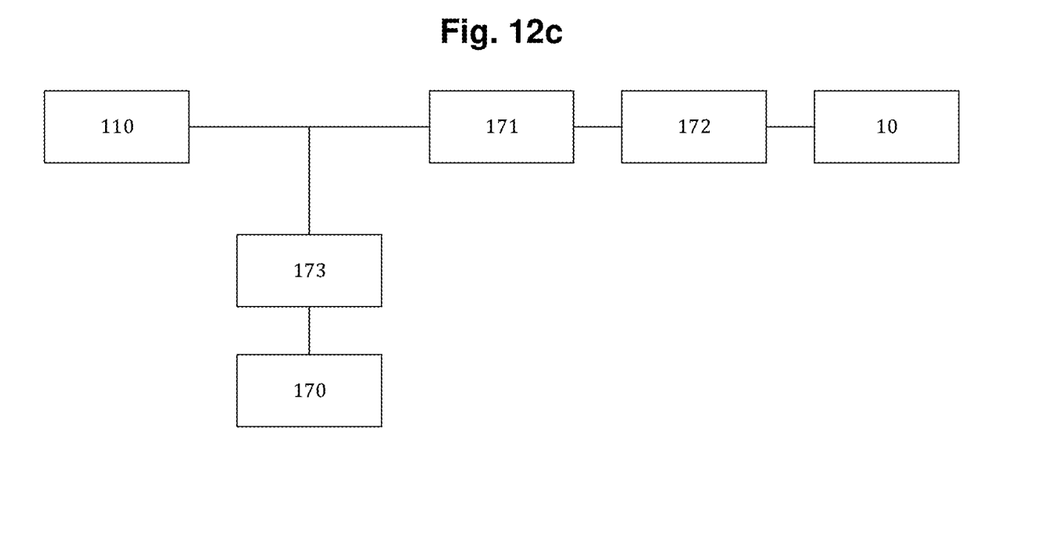

In a third example, illustrated in FIG. 12*c*, the generator 133 is a DC generator but not voltage-matched to the battery 170. In this case, a DC/DC transformer 173 is added, connected between the battery 170 and the station 110 and/or the inverter 171.

In all cases 12*a*-12*c*, the battery 170 may be arranged with a control function for switching on/off battery 170 charging/discharging, for instance under the control of control device 180.

In preferred embodiments, the station 110 hence comprises a DC generator, arranged to supply a voltage on its output, the supplied voltage being close to a voltage of the battery 170, in the sense that the battery 170 may accept such voltage directly for charging. In this case, it is possible to use one and the same inverter 171 for providing both a DC voltage to the battery 170 and an AC voltage to the power grid 10.

In other embodiments, the voltage produced by the generator is variable as a result of a varying controlled load and/or speed of the ropeway 130.

It may even be possible to use the ropeway 130 as a frequency-regulating component of the power grid 10, in the sense that electric energy flow to and from the system 100 may be regulated on a relatively short time scale. Such regulation may take place by accelerating and decelerating the transport wire 131, which can take place very quickly and involving relatively high powers.

However, in some use cases the battery 170 can provide even quicker to/from power regulation of the system 100, and may allow larger instantaneous power flows to/from the system 100. As is illustrated in FIG. 1, the battery 170 may preferably be connected in parallel to, and between, the ropeway 130 and the power grid 10.

The weights 140 are arranged to be attached to the transport wire 131 at the first station 110, and thereafter be transported, by their attachment to the transport wire 131, upwards to the second station 120. To achieve this, the ropeway 130 is arranged to activate the electric motor 132 to transport the plurality of weights 140, by transforming an available electric energy into gravitational potential energy of the weights 140 as the weights 140 are transported by the ropeway 130 from the first station 110 to the second station 120. The electric energy may first be transformed into kinetic energy, by accelerating the weights 140 in the process. Hence, electric energy is required for the motor 132 to agitate the transport wire 131 of the ropeway 130 so as to raise the weights 140, by the weights 140 being pulled along the ground 20 as the transport wire 131 moves. This energy is transformed, such as via kinetic energy, to gravitational potential energy of the weights 140 as they are raised up to the second station 120. The electric energy required may be taken from the battery 170 and/or from the power grid 10.

Moreover, the ropeway 130 is arranged to transport the plurality of weights 140 by allowing them to move in the gravitational field, from the second station 120 back to the first station 110. This way, said gravitational potential energy may be transformed into kinetic energy. At any rate, the electric generator 133 is activated to transform the potential energy, such as via kinetic energy, to electric energy. Hence, the weights 140, connected to the transport wire 131 of the ropeway 130, are allowed to propel the transport wire 131 they are attached to by moving in the gravity field, so as to fall downwards, towards the first station 110, along the ropeway 130. The generator 133 is used to transform the potential energy into electric energy, that is then fed to the battery 170 and/or the power grid 10.

It is realised that other configurations are also possible, such as using photovoltaic cells to produce electric energy used to propel the motor 132, and using the electric energy output by the generator 133 for performing some kind of work, such as driving an electric machine or heating a heat medium.

Figure 2:
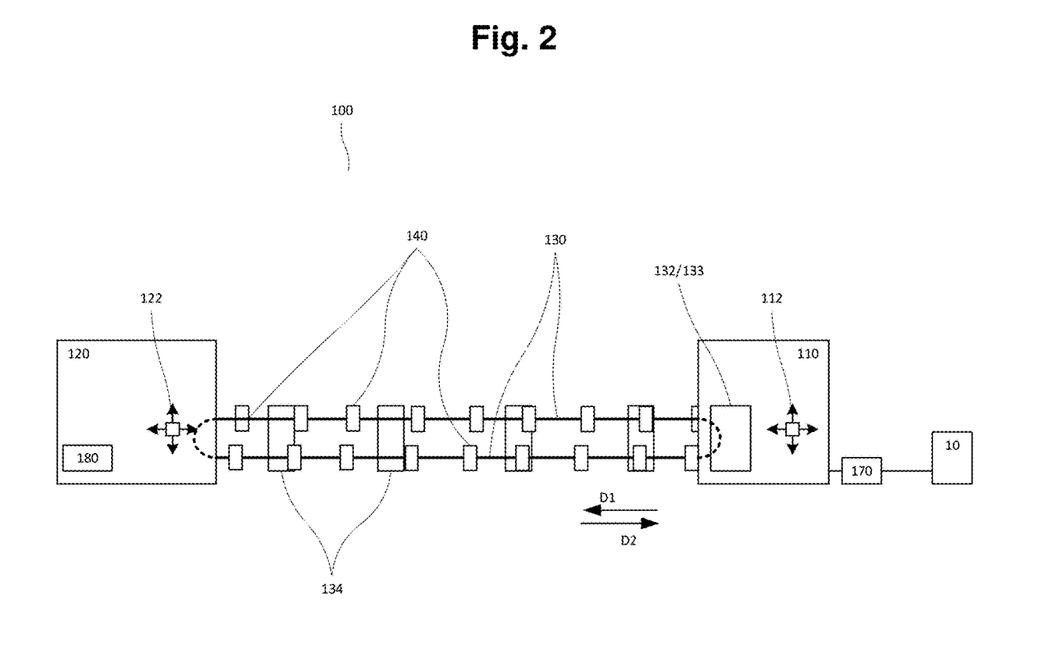
FIG. 2 corresponds to FIG. 1, but is seen from above.

FIG. 2 illustrates the system 100 from above. Here it can be seen that the transport wire 131 runs in an endless loop, from the first station 110 to the second station 120 and back again. In each station 110, 120, it may run around a wheel, such as conventional as such drive wheel for ropeways. The motor 132 and/or generator 133 may be connected for driving/braking one or several such wheels. Such wheels may also be provided with tension-increasing devices, providing sufficient tension in the transport wire 131 during operation of the ropeway 130.

Figure 3:
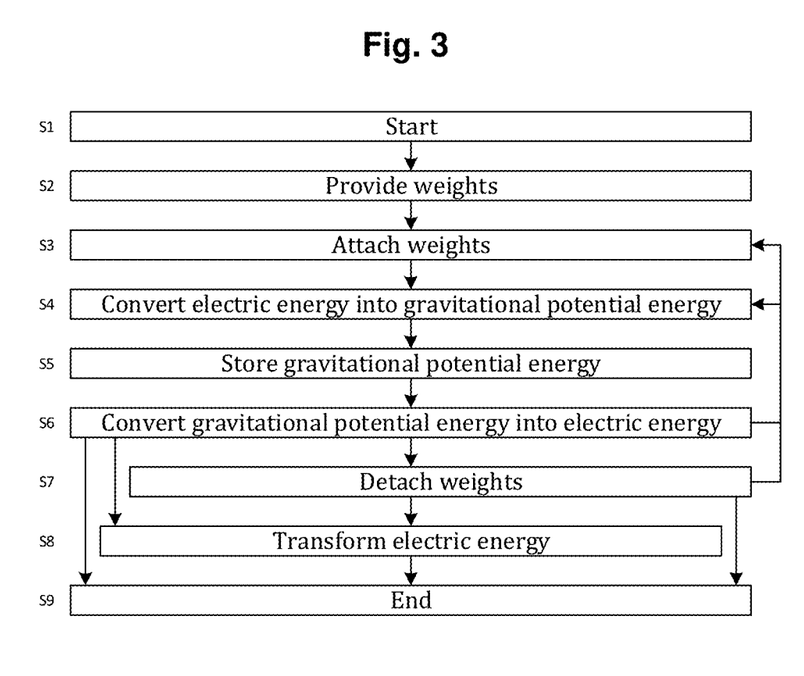
FIG. 3 is a flowchart illustrating a method.

FIG. 3 illustrates a method according to the present invention, using the system 100 to perform the method, the method being for storing energy in the form of gravitational potential energy.

In a first step S1, the method starts.

In a subsequent step S2, the weights 140 may be provided, if this has not already been performed.

In a subsequent step S3, a plurality of the weights 140 are attached to the transport wire 131 of the ropeway 130 at the first station 110. This attaching between each weight 140 and the transport wire 131 is preferably temporary and using a detachable engagement mechanism between the weight 140 and the transport wire 131, so that the weights 140 are attached to the transport wire 131 at the first station 110 before being sent up to the second station 120.

Once at the second station 120, the weights 140 may again be detached before, at a later point in time, being reattached to the transport wire 131 for resending down to the first station 110, where they may again be detached, and so forth, back and forth between the first station 110 and the second station 120.

The attaching and detaching may be of one weight 140 at a time at each respective station 110, 120.

In a subsequent step S4, the electric motor 132 is used to transform available (available from the battery 170 and/or power grid 10) electric energy into potential energy, such as via kinetic energy as described above, by transporting the weights 140, such as by accelerating or at least driving the transport wire 131, and as a result also the plurality of weights 140, along the ropeway 130 to which the weights 140 are attached, from the first station 110 towards and to the second station 120.

It is realised that the motor 132 is providing the electric energy that achieves the raising of the weights 140 from the first station 110 to the second station 120, whether the weights 140 may be first accelerated and then lifted up during deceleration; be held at a completely or roughly steady speed along the length of the ropeway 130; or be accelerated all the way up to the second station 120.

In a subsequent step S5, the weights 140 are held at said second station 120, the system 100 thereby storing the gravitational potential energy represented by the previous raising of the mass of each of the weights 140.

In a subsequent step S6, which may be performed at a later point in time with respect to each individual weight 140, said gravitational potential energy is again transformed back into electric energy. This is achieved by allowing the weights 140 to move in the gravitational field, while being conveyed along the ropeway 130, from the second station 120 towards and to the first station 110, as described above, loading the generator 133. Again, the weights 140 may travel at an accelerating, constant or roughly constant, or decelerating, velocity along the ropeway 130 on their way down to the first station 110, as the case may be. Again, the important thing is that the gravitational potential energy is converted, by the generator 133, into electric energy and may be provided to the battery 170 and/or the power grid 10.

The electric generator 133 may decelerate (or at least limit an otherwise occurring acceleration of) the transport wire 131 of the ropeway 130, hence producing said electric energy. Put another way, the electric generator 133 is loaded by the weights 140 of the transport wire 131 to affect the motion of the weights so that they are not in freefall along the path of the transport wire 131.

It is further realised that an energy conversion from electric energy to kinetic energy to potential energy and then back to kinetic energy and electric energy may alternatively be described as a conversion from electric energy directly to potential energy, due to the loading of the motor by the mass of the weights 140; and then a corresponding direct conversion from potential back to electric energy by the generator being thus loaded by the mass of the weights 140.

In a subsequent step S7, the weights 140 may again be detached from the transport wire 131 for storing in the first station 110 until again being attached for transport back up to the second station 120. It is realised that step S5 may also include such detaching and reattaching of the weights 140 at the second station 120.

In a step S8, that may be performed continuously during lowering of the weights 140, the electric energy made available by the generator 133 may be transformed (by transformer 172 and/or inverter 171) so as to be compatible with the requirements of a consumer (such as the battery 170 or the grid 10) of the produced electric energy. For instance, such transforming may comprise modifying a voltage of the output electric power, and/or changing from DC or AC or vice versa.

In a subsequent step S9, the method ends.

As illustrated in FIG. 3, the method may be iterative, so that the weights 140 are taken up to the second station 120 and back down to the first station 110 repeatedly, with or without detaching/reattaching the weights 140 at either station 110, 120 during the process.

Figure 4:
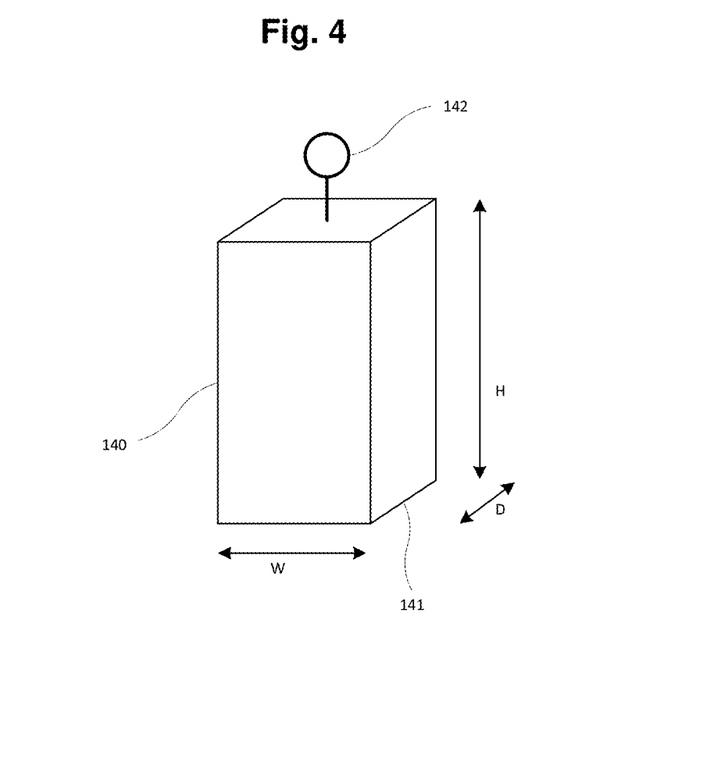
FIG. 4 is a simplified view of a weight.

FIG. 4 illustrates an exemplifying weight 140.

One important finding of the present invention is that the weights 140, in contrast to the case in conventional ropeways designed for transportation of persons or cargo, may be made much more compact and hence with a higher total density. To achieve this, the weights 140 may preferably be made from concrete and/or a metal material, such as iron or other steel material. The weights 140 may also be in the form of water-filled or sand-filled containers (such as plastic containers). In other embodiments, the weights 140 may be made from other mineral material such as stone.

The weights 140 may also comprise rubber or other resilient material, to increase robustness during transport, handling and storing. Such resilient material may for instance serve as a surface damper between neighbouring weights 140 when such weights 140 come into direct contact with each other.

One simple manner to manufacture such weights 140 is by casting of such material. For instance, the weights 140 may be comprise, to 80% by weight or more, material that is cast to assume its shape, such as cast concrete or iron.

In order to achieve this, it is preferred that the weights 140 are stackable, in other words that they are provided with a shape allowing them to together form a stack of the weights 140. Such stacking may take place in the direction and orientation of travel of the weights 140 along the ropeway 130 or in other directions/orientations, depending on the design of a weight handling mechanism 112, 122 (see below).

It is noted that conventional ski lift ropeway seats may be stackable. However, in contrast thereto, it is preferred that the present weights 140 are much more closely stackable. Namely, it is preferred that each of the weights 140 comprises a stackable part 141, being arranged to be stacked together with corresponding stackable parts of other weights 140 so as to form a stacked body containing at the most 20% air. Hence, when defining a stacked volume as a peripheral envelope surface 145 (see FIG. 5) of a stack 144 of such weights 140, the stacked volume contains 80% or more of said stackable parts 141 of the weights 140 in question and less than 20% air.

The stackable parts 141 may each be massive, and may be made from said concrete and/or metal material.

One example, shown in FIG. 4, of such a stackable part 141 is in the form of a respective parallelepiped-shaped part, for instance a cuboid. However, the stackable part 141 may comprise various shape details guiding one such stackable part 141 into engagement with its neighbour so as to form said stack 144. Such shape details are shown, in FIG. 5, in the form of stacking engagement means 143 in a stack 144 of weights 140.

Figure 5:
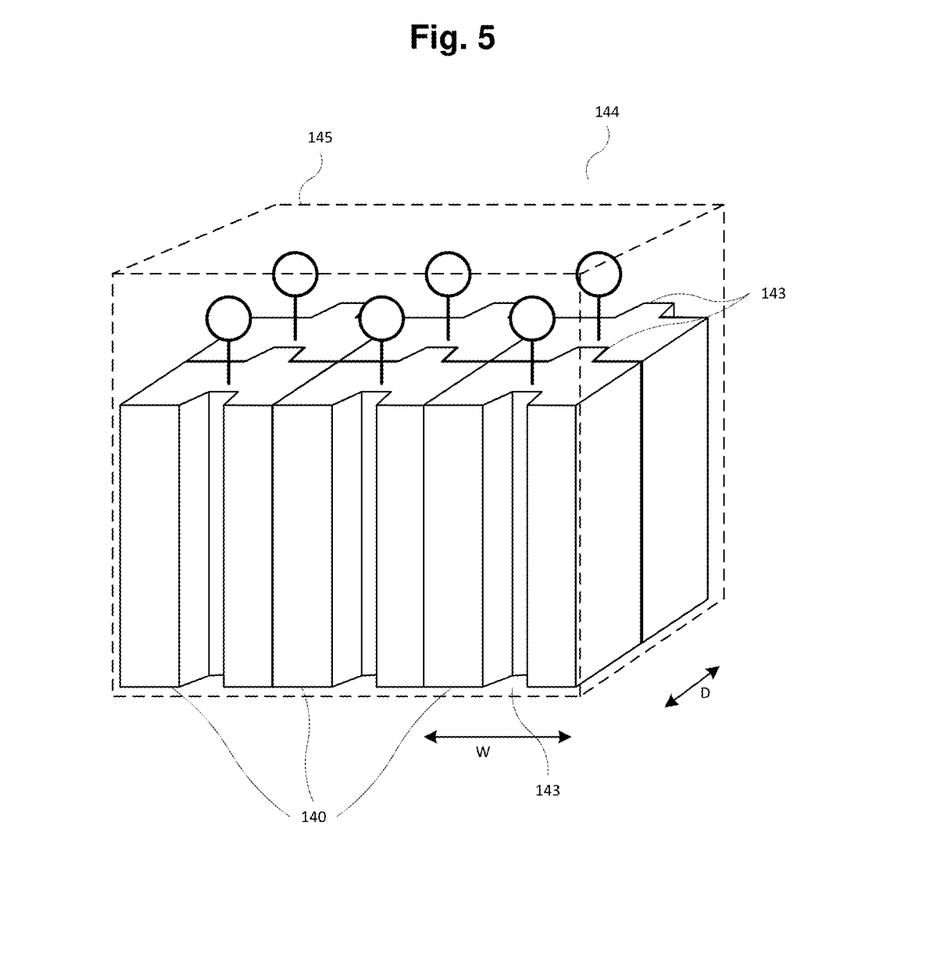
FIG. 5 is a simplified view of a stacked set of weights.

It is realized that any such engagement means 143 may be used, comprising protrusions and/or recessions designed, to form a stack 144 that is both overall compact and that limits lateral relative movement of neighbouring weights 140 in at least one direction, depending on how the stacked weights 140 are stored in the stations 110, 120.

At any rate, the weights 140 may be stored in stacked form in the stations 110, 120, the stack 144 being laid out over one, two or three dimensions so that the weights 140 together define a vector (line), or a 2 or 3 dimensional matrix.

As mentioned, FIG. 5 illustrates an exemplifying stack 144 across two dimensions (width W and depth D), also illustrating how the engagement stacking means 143 provide compact engagement between individual weights 140.

Such compact weights 140 can be made with dimensions (height H, width W, depth D) small enough to allow a relatively compact design of the ropeway 130 as a whole. Hence, the weights 140 may be arranged with a total height H allowing the weights 140 to protrude no more than 5 meters, such as no more than 3 meters, down from the transport wire 131 when being attached thereto. This achieves, in turn, that the posts 134 can be made relatively short, providing a less expensive yet sturdy implementation.

In order to increase the mass of each individual weight 140, the width W and/or depth D may instead be increased. In preferred embodiments, a horizontal cross-section of each weight 140, such as of a respective stackable part 141 of the weight 140 in question, may be at least 0.2 $m^2$, such as at least 0.5 $m^2$, 1 $m^2$, such as at least 2 $m^2$.

Another advantage provided by the present invention is that a large number of weights 140 can be used concurrently in the system 100, by merely creating enough storage space at the stations 110, 120 to hold weights 140 not currently being transported upwards or downwards along the ropeway 130.

Preferably, the weights 140 may be at least twice in number, such as least five times in number, or even at least ten times in number, such as at least one hundred times, such as at least one thousand times, as compared to a total number of weights 140 that can simultaneously fit along the transport wire 131 of the ropeway 130.

The weights may be arranged on the transport wire 131 with a minimum inter-weight distance of at the most 20 meters, such as at the most 10 meters, such as at the most 5 meters. The total number of weights 140 used in the system 100 may be at least 200, such as at least 500, such as at least 1,000, such as at least 10,000.

In some embodiments, the weights 140 are transported along the transport wire 131 with direct contact between neighbouring weights 140 along at least part of the ropeway 130. Stacking engagement means 143 of the above-discussed type may allow mutual engagement between neighbouring weights 140 travelling along the ropeway 130, so as to limit swinging and other non-wanted movement of the weights 140.

It is noted that the weights need not comprise any means for conveying any person or cargo. Instead, each weight 140 can be designed to maximize the density of the space allotted to each weight 140, when in transit along the ropeway 130 but in particular when being stored in either station 110, 120. Hence, it is preferred that the weights 140 do not comprise any seat or any pulling device for a human sitting, or for a human standing on skis. At the same time, it is foreseen that a limited number of transport devices for service technicians, apparel, spare parts, etc., may be used in the system 100, in addition to the weights 140, and transported back and forth between the stations 110, 120 when such transportation requirements arise.

As understood from the above, the stations 110, 120 are each arranged to store the weights 140 not currently being transported along the ropeway 130. In particular, the first 110 and/or second 120 station may be arranged to store the weights 140 in a state disconnected from the transport wire 131 of the ropeway 130. Hence, when each weight 140 arrives at the station 110, 120 in question it is then detached from the transport wire 131 and put into storage in the station 110, 120 in question. Before being transported again, it is then reattached to the transport wire 131 so that it can start moving along the ropeway 130.

It is advantageous that the storing of the weights 140 is space-efficient. This may be accomplished by stacking the weights 140 as described above, along a line but more preferably in a two-dimensional or three-dimensional grid or matrix.

Such packed or stacked weights 140 will then, inside the station 110, 120 in question, together form a peripheral envelope surface 145, of the body formed by all the weights 140 stacked together, as described above. Then, the storing of the weights 140 at the first 110 and/or second 120 station may be such that the weights 140 are arranged to be able to occupy (and during operation at least from time to time actually occupy) at least 50% of a total storing volume defined by such an envelope surface 145 of the outer-most weights 140.

As is illustrated in FIGS. 2 and 6, and as discussed herein, at least one of the first station 110 and the second station 120, preferably both stations 110, 120, may comprise a respective storing space 111, 121 for weights 140. Furthermore, the first 110 and/or second 120 station may comprise a respective weight handling mechanism 112, 122, arranged to automatically disconnect/detach weights 140 from the transport wire 131; to transport such disconnected weights 140 to a respective storing location in the storing space 111, 121 for storing; to transport disconnected weights 140 back to the transport wire 131; and to reconnect disconnected weights 140 to said transport wire 131 for transport along the ropeway 130.

The weight handling mechanism 112, 122 may be a per se conventional automatic storage robot, arranged to attach to individual weights 140 and to move them about in the storing space 111, 121. The weight handling mechanism 112, 122 may comprise an overhead crane, arranged to lift and horizontally displace weights 140; a wheeled trolley system arranged to support and horizontally displace weights 140; a rail system arranged to support and horizontally displace weights 140; and so forth.

Since the weights 140 may be identical, the storage may be a FILO (First In Last Out) storage. In other embodiments, the storage contains weights 140 of at least two different masses, and the weight handling mechanism 112, 122 comprises selection means to select weights for attachment and transport depending on a current total system 100 power requirement. Alternatively or in addition thereto, the weights 140 may be attached to the transport wire 131 at varying wire 131 length intervals. Alternatively or in addition thereto, a share of gripping devices 150 (see below) attached to the wire 131 and transported thereby that actually hold a respective weight 140 (as opposed to travelling along the ropeway 130 empty, without holding a weight 140) may be varied.

The system 100 may comprise a control device 180, arranged to communicate with the weight handling mechanisms 112, 122 and the ropeway 130 so as to achieve automatic handling of weights 140 in the system 100. Hence, the control device 180 may be arranged to control the ropeway 130 to move the transport wire 131 with weights 140 attached thereto to the second station 120; to control the weight handling mechanism 122 of the second station 120 to detach the weights 140 and move the weights 140 into the storing space 121 of the second station 120 for storing; to control the weight handling mechanism 122 of the second station 120 to again move the weights 140 to the transport wire 131 and to attach the weights 140 to the transport wire 131; to control the ropeway 130 to move the transport wire 131 with weights 140 attached thereto to the first station 110; to control the weight handling mechanism 112 of the first station 110 to detach the weights 140 and move the weights 140 into the storing space 111 of the first station 110 for storing; to control the weight handling mechanism 112 of the first station 110 to again move the weights 140 to the transport wire 131 and to attach the weights 140 to the transport wire 131; and so forth.

In some embodiments, the storing space 111, 121 of one or both of the stations 110, 120 is a vertical storage space, arranged to store weights 140 in several stories 117, 127. To accomplish this, the weight handling mechanism 112, 122 may comprise a weight 140 lifting and lowering device, such as a lift or crane device.

As is also illustrated in FIG. 6, the first station 110 and/or the second station 120 may comprise a respective weight deceleration mechanism 115, 125. The weight deceleration mechanism 115, 125 may be arranged to decelerate the weights 140 incoming towards the station 110, 120 in question to a velocity that the weight handling mechanism 112, 122 can handle when receiving and detaching the weights 140 as describe above. This deceleration may take place after the weight 140 in question has been de-coupled from the wire 131, in any of the ways described below, and before the weight 140 reaches the weight handling mechanism 112, 122.

The weight deceleration mechanism 115, 125 may comprise a local uphill part 116, 126, such as a small bump that the weight 140 passes. The local uphill part 116, 126 may comprise a local bending of a path along which the weight 140 travels, such as a stationary wheel pathway across which the weight 140 travels carried on wheels rolling across the pathway. The local uphill part 116, 126 may be arranged to locally raise a weight 140 as it passes the uphill part 116, 126.

Moreover, the uphill part 116, 126 may be arranged to slow a velocity of the weight 140 using only the increased gravitational potential energy of the weight 140 as deceleration mechanism. In other words, in some embodiments the weight deceleration mechanism 115, 125 comprises no friction brake, magnetic brake or similar.

In some embodiments, the weights 140 passing the weight deceleration mechanism 115, 125 are decelerated to a velocity of at the most 2 m/s, such as at the most 1 m/s, or even to a standstill or approximate standstill.

A corresponding weight acceleration mechanism 119 may be provided, arranged to accelerate the weight 140, such as by passing a downhill part, before reaching the wire 131 for attachment thereto. This is exemplified in FIG. 7. Such a downhill part may have a height difference selected so as to allow the weight 140 to reach a velocity of the wire 131 when the gripping device 150, with or without the weight 140 attached, reaches the wire 131 for attachment thereto. As is the case for the weight deceleration mechanism 115, the weight acceleration mechanism 119 may be adjustable, such as by varying the height difference of the downhill part.

In some embodiments, the weights 140 handled by the weight handling mechanism 112, 122 are generally held at a height that is above a height of the weights 140 when detaching from and attaching to the wire 131, the height difference corresponding to a height difference of an uphill/downhill part of the weight deceleration mechanism 115 and/or weight acceleration mechanism 119.

In these and other embodiments, the weights 140 travel along the ropeway 130 at a velocity, such as a constant velocity, along the ropeway 130 of at least 5 m/s, such as at least 10 m/s. However, it is foreseen that the instantaneous input/output power of the system 100 may be regulated by at least one of a first control mechanism, wherein a total net number of weights 140 that in any one instant are being transported up or down is controlled; and a second control mechanism, wherein a transport velocity of the ropeway 130 in any one instant is controlled. Therefore, the velocity of the weights 140 arriving at the weight deceleration mechanism 115, 125 may vary.

It may be preferable to provide a constant velocity of weights 140 arriving at the weight handling mechanism 112, 122. For this and other reasons, the uphill part 116, 126 may be adjustable, so that a total distance that the weight 140 is raised as the weight 140 passes the uphill part 116, 126 can be adjusted depending on an incoming velocity of the weight 140 towards the uphill part 116, 126. The control device 180 may be arranged to control the weight deceleration mechanism 115, 125 so as to achieve a predetermined arrival velocity of weights 140 at the weight handling mechanism 112, 122, depending on a controlled current transport velocity of the ropeway 130. It is realised that each weight 140 arriving at the weight deceleration mechanism will normally depend on a travel velocity of the transport wire 131.

The weight acceleration mechanism 119, if used, may be controlled by the control device 180 in a manner corresponding to how the weight deceleration mechanism 115, 125 is controlled.

It is generally preferred that the system 100 comprises a plurality of gripping devices 150, arranged to detachably fasten the weights 140 to said transport wire 131. It is realised that it is possible, as an alternative to using such gripping devices 150, to have a longer transport wire 131 that can be led in a pattern in the storing spaces 111, 121 corresponding to a desired storing pattern of the weights 140. However, using detachable gripping devices 150 affords greater flexibility both in terms of storing efficiency, scalability and system 100 power control.

Turning to FIGS. 7-11, an exemplifying station 110 or 120 is illustrated, together with a number handled weights 140. It is noted that the station1 110, 120 illustrated in FIGS. 7-11 is simplified with the purpose of clearly illustrating the principles described herein.

Figure 7:
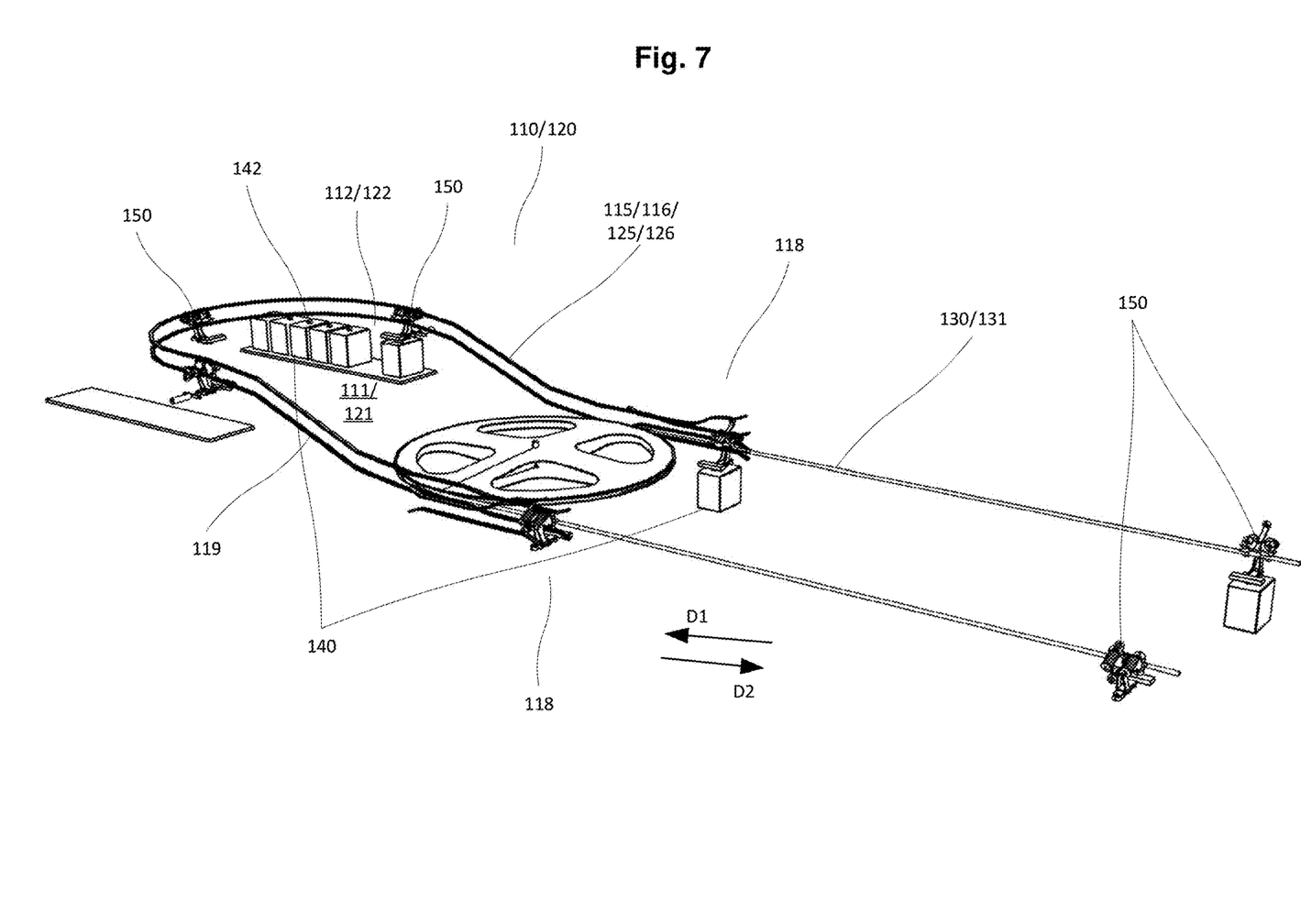
FIG. 7 is a perspective view of an exemplifying station.

In FIG. 7, a motor/generator wheel is shown, along with the transport wire 131, a delinking mechanism 118 arranged to delink and relink individual weights 140 from/to the transport wire at the end of the ropeway 130 for handling by the weight handling mechanism 112. In FIG. 7 the weight handling mechanism 112 is indicated but not shown in detail. It may, for instance, comprise a conventional programmable industrial robot comprising an arm with a gripping means for gripping and moving weights 140. Weights 140 may be transported on wires, moving floors or in any other suitable manner.

Figure 8:
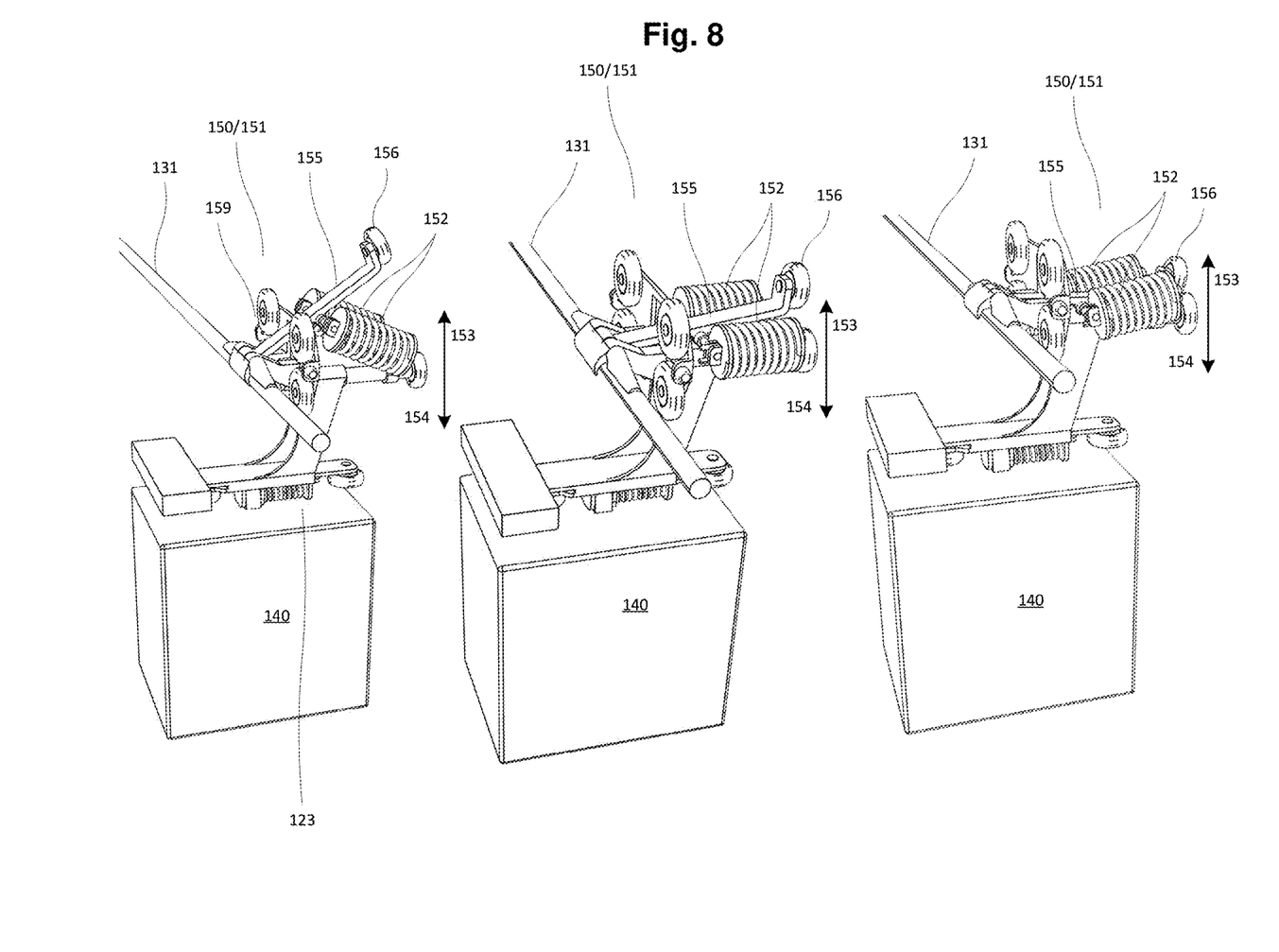
FIG. 8 is a perspective view of an exemplifying gripping mechanism in three different states.

As illustrated in FIG. 8, a respective gripping mechanism 151 of each of said gripping devices 150 may be spring-loaded in two different directions 153, 154, away from an unstable state (middle image in FIG. 8), so that the gripping mechanism 151 moves into fixed and stable engagement with the wire 131 (left image in FIG. 8) and so that the gripping mechanism 151 moves to a stable resting state (right image in FIG. 8) not in engagement with the wire 131 (the wire gripper open) in the other direction.

To achieve this, the gripping mechanism 151 comprises at least one, such as two, springs 152 and a lever 155. The lever 155 is spring-loaded away from said unstable state (a pivot location lying between a stable locked pivot position and a different stable unlocked pivot position). In other words, the lever 155 is arranged to pivot, against the spring force of the spring 152, from the locked state shown in FIG. 8, left image, towards the unstable point illustrated in FIG. 8, middle image. Once it passes the unstable point, the spring 151 will urge the lever 155 further, to the stable open or unlocked state illustrated in FIG. 8, right image. Similarly, the lever can move, against the spring 151 force, from the stable unlocked state to the unstable state, and thereafter, pushed by the spring 151, further to the stable gripping or locked state.

Figure 9:
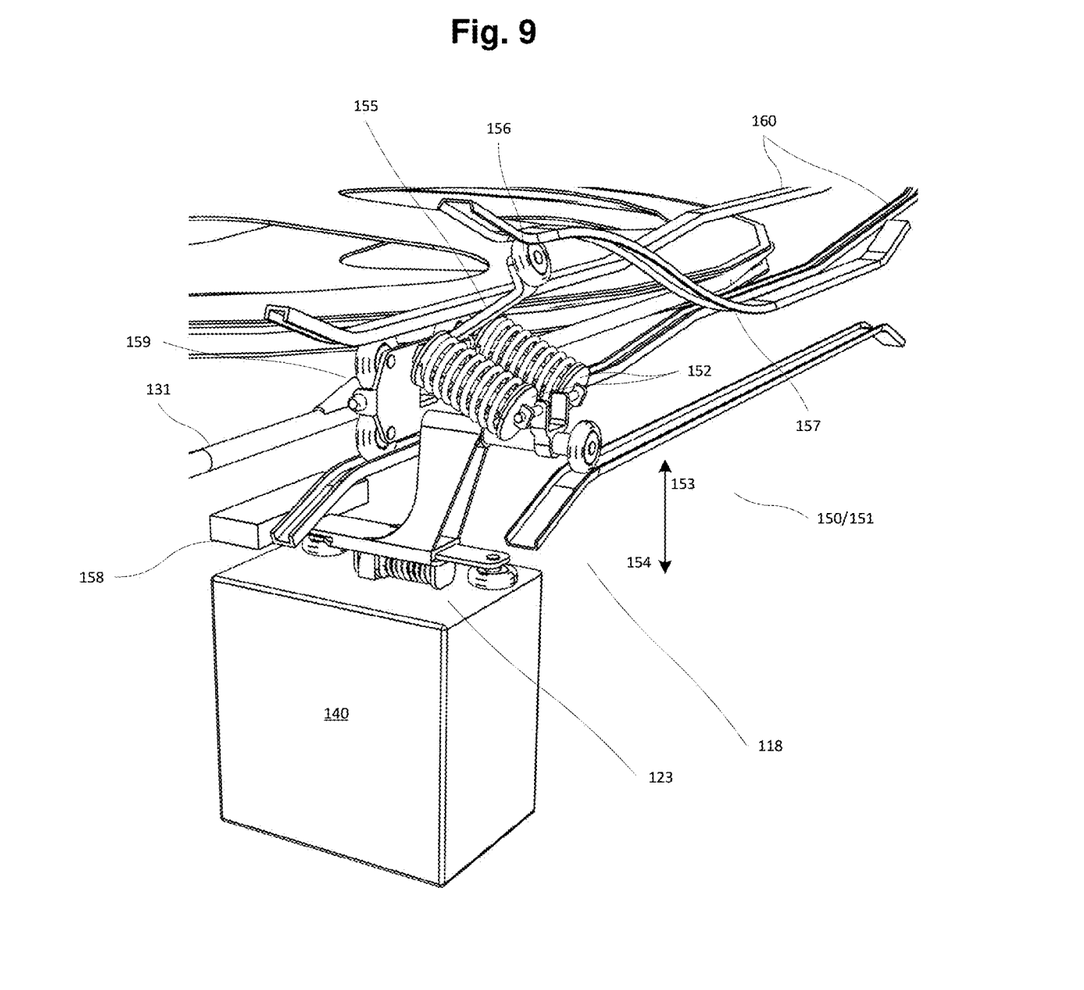
FIG. 9 is a perspective view of an exemplifying weight and the gripping mechanism illustrated in FIG. 8, in combination with parts of a ropeway.

The lever 155 may comprise a control wheel 156 engaging with a stationary wheel path 157 of the delinking mechanism 118 so as to move the lever 155 (and hence the gripping mechanism 151 in and out of the locked/unlocked states as described. This is illustrated in FIG. 9.

Hence, each gripping mechanism 151 is arranged to detachably fasten an individual weight 140 to the transport wire 131 for transport between stations 110, 120. Each gripping device 150 may comprise two cooperating engagement parts, one arranged on a weight 140; and one arranged on the transport wire 131, or arranged to be fastened to the transport wire 131 when a weight 140 is to be fastened to the wire 131. When the cooperating engagement parts engage, the weight 140 is by this engagement detachably fastened to the wire 131 for transport along the ropeway 130. It is understood that the gripping mechanism 151 may constitute one of said two cooperating engagement part and the gripping device 150 being formed by both cooperating engagement parts.

In general, each gripping device 150 may include an active/activatable (gripping) part and a passive (gripped) part. The gripped part may be a steel loop, a cast-material shape feature, or any other suitable shape designed to engage with the activatable cooperating engagement part.

It is preferred that the active/gripping part is detachable from the weight 140, whereas the passive/gripped part is arranged as a part of each weight 140. This provides for a simpler weight 140 design, and offers a design that can better withstand ice build-up during a cold season. Also, the number of movable-part gripping mechanisms can be made smaller than a total number of weights 140.

In some embodiments, each gripping mechanism 151 (active/gripping part) is attached to, such as permanently attached to, and move with, the transport wire 131. In other embodiments, the gripping mechanisms 151 (active/gripping part) are arranged to detachably be fastened to the transport wire 131 when used to attach and hold a respective weight 140 to the transport wire 131, and when not holding a weight 140 instead be stored in one of the stations 110, 120 (illustrated in FIG. 6). It is realised that the weight handling mechanism 112, 122 can then be arranged to handle gripping mechanisms 151 in a manner corresponding to what has been described above in relation to the handling of weights 140 in the stations 110, 120. The method may comprise sending such gripping mechanisms 151, without a corresponding weight 140, along the ropeway between stations 110, 120 in case a balancing of such gripping mechanisms 151 is required.

In FIG. 4, the weight 140 is illustrated with a passive (gripped) part 142 being arranged on the weight 140 in the form of a hook that can be gripped by an active (gripping) part.

Figure 10:
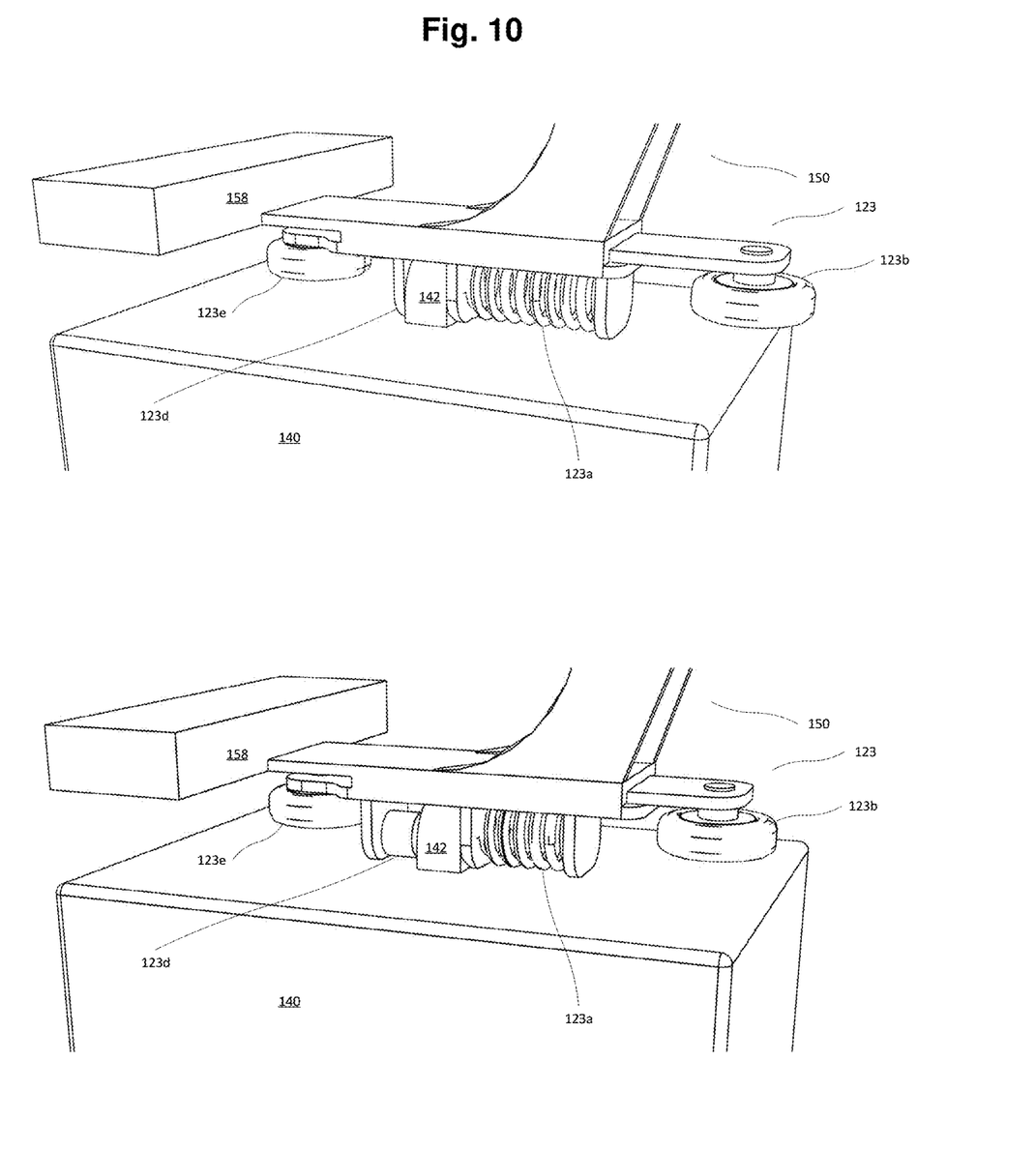
FIG. 10 is a perspective view illustrating a weight gripping mechanism in two different states

In FIG. 10, a more detailed example is shown. The weight 140 has a passive (gripped) fastening device 142, whereas the gripping device 150 has an active (gripping) fastening device 123 in the form of a weight 140 attaching/detaching mechanism. The fastening devices 123, 142 are arranged to cooperate by mutual engagement.

The weight 140 attaching/detaching mechanism comprises a spring 123a arranged to be activated (such as compressed) by a wheel 123b moving in a stationary wheel path or actuator 123c (FIG. 11), against a spring force of the spring 123a, so that a gripper 123d disengages from the fastening device 142 and the weight 140 as a result disengaging from the gripping device 150 (FIG. 10, lower image). 123e denotes a wheel used to apply a counter force when pushed against a rigid support (not shown). When the wheel 123b is allowed to move back, pushed by the spring 123a, the gripper 123d again engages with the fastening device 142 so as to fasten the weight 140 to the gripping device 150 (FIG. 10, upper image).

Hence, the gripping device 150 may involve one or both of a fastening device arranged to fasten to the wire 131 and a fastening device arranged to fasten to the weight 140. These fastening devices may be independently activatable, such as using different stationary wheel pathways as described above. Using the gripping device 150 the weights 140 can be fastened to the wire 131 for transport between stations 110, 120, and detached from the wire 131 for storage in either station 110, 120. This provides for good flexibility in terms of handling of the weights 140 and the gripping devices 150 in the system 100.

As is also illustrated in FIG. 10, the gripping device 150 may comprise a counter-weight 158, arranged so that the gripping device 150 can hang sufficiently straight from the wire 131 in case no weight 140 is attached to the gripping device 150.

In some embodiments, the gripping mechanisms 151 are arranged to be heated, such as electrically heated. For instance, each gripping mechanism 151 may be arranged with a heating coil arranged to be powered via an electric connection to the weight handling mechanism 112, 122 when in storage in a station 110, 120. Each gripping mechanism 151 may hence have an electric connector or interface arranged to accept an electric current and circulate it in the gripping mechanism 151. In some embodiments, the gripping mechanisms 151 are heated during stationary storing and/or handling in the station 110, 120 but possibly not when being moved by the ropeway 130.

Figure 11:
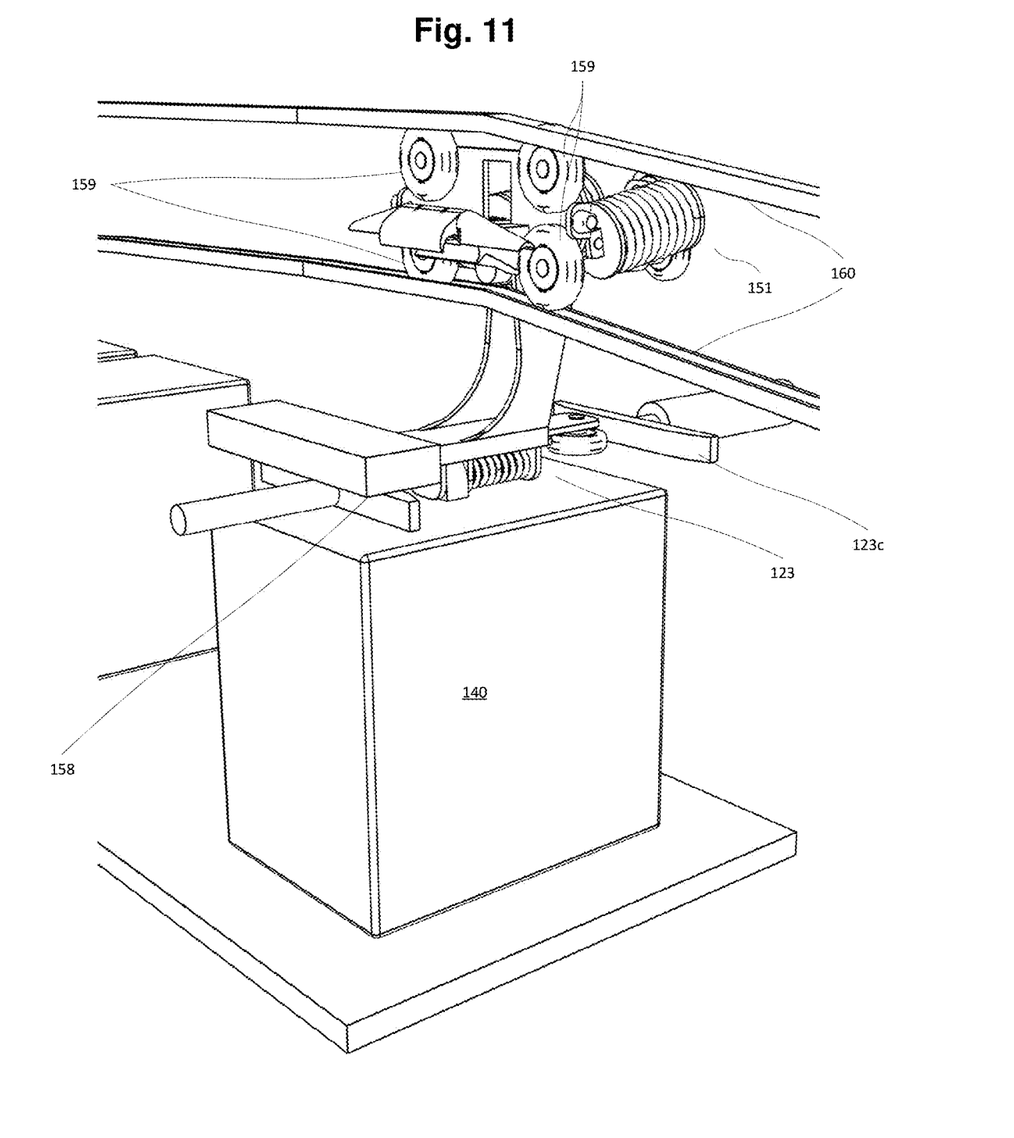
FIG. 11 is a perspective view of a weight with a gripping mechanism in the station shown in FIG. 7.

As is also shown in FIG. 11, the gripping mechanism 151 may comprise two pairs of transport wheels 159, one pair being arranged to support the gripping mechanism 151 (and possibly a carried weight 140) on a lower part of a stationary wheel path 160, and an additional pair being arranged to roll or slide against an upper part of the stationary wheel path 160. The lower and upper parts of the wheel path 160 may run along a section of the wheel path 160 arranged to convey weights 140, or gripping devices 150 not holding any weight 140, when not attached to the wire 131. This provides increased stability during decoupling and recoupling of the weight 140 with respect to the transport wire 131 and/or with respect to the gripping device 150, since the weight 140 is then prevented from swinging about an axis being parallel to a transport path of the weights 140 guided by said wheels 159.

As is illustrated in the Figures, and as mentioned above, the transport wire 131 may be an endless wire, driven by at least one driving wheel at one of the stations 110, 120. In this case, the ropeway 130 may be arranged to be driven in a first direction D1 (the direction referring to a drive direction of one of the two parts of the endless loop wire 131) to transport weights 140 from the first station 110 to the second station 120, and in a second, opposite direction D2 to transport weights 140 from the second station 120 to the first station 110. Alternatively, the ropeway 130 may be arranged to be driven in the same direction D1 or D2 to transport weights 140 from the first station 110 to the second station 120 as to transport weights 140 from the second station 120 to the first station 110. In some embodiments, these two modes of operation may be combined, so that the control device 180 can drive the ropeway in either direction D1, D2 and attach/detach weights 140 to either one of the two parallel parts of the transport wire 131 forming said endless loop. This may provide for a more flexible operation, with shorter adjustment time when adjusting a total instantaneous system 100 power.

Above, preferred embodiments have been described. However, it is apparent to the skilled person that many modifications can be made to the disclosed embodiments without departing from the basic idea of the invention.

For instance, the weights 140 may be designed in many different ways, and the system 100 may be employed in many different types of geographies.

Since comfort and security considerations normally require ropeways for person or cargo transport to limit accelerations during such transport, high-end such ropeways will normally be equipped with rather complex devices for delinking transported objects to a separate drive chain, having a lower velocity than the main transport wire. In the present solution, such delinking devices are not required, since the weights 140 can be designed to be sturdy enough to withstand rather high accelerations.

All that has been said with respect to the present method is equally applicable to the present system, and vice versa.

Hence, the invention is not limited to the described embodiments, but can be varied within the scope of the enclosed claims.

The invention claimed is:

1. A system for storing energy in the form of gravitational potential energy, the system comprising:
   a plurality of weights;
   a first, lower, station arranged to receive and hold the weights and a second, higher, station arranged to receive and hold the weights; and
   a ropeway, arranged to transport the weights back and forth between said first station and said second station, the ropeway comprising a transport wire, an electric motor and an electric generator, said weights being arranged to be attached to said transport wire at said first station,
   wherein the ropeway is arranged to activate the electric motor to transport said plurality of weights, by transforming an available electric energy into gravitational potential energy of said weights as the weights are transported by the ropeway along the ground from the first station to the second station,
   wherein the ropeway is arranged to transport said plurality of weights in the gravitational field from the second station to the first station by gravity, and to activate the electric generator to transform said potential energy to electric energy, and
   wherein the first station and/or the second station further comprises a respective storing space and a respective weight handling mechanism, the weight handling mechanism being arranged to disconnect weights from said transport wire, to transport disconnected weights to a respective location in the storing space, to transport disconnected weights back to the transport wire; and to reconnect disconnected weights to said transport wire.

2. The system of claim 1, wherein:
   the electric generator and the electric motor are one and the same.

3. The system of claim 1, wherein:
   the weights are made from concrete and/or metal material.

4. The system of claim 3, wherein:
   the weights comprise, at least 80% by weight, material that is cast to assume the shape of the weights.

5. The system of claim 1, wherein:
   each of the weights comprises a stackable part arranged to be stacked together with corresponding stackable parts of other weights so as to form a stacked body.

6. The system of claim 1, wherein:
   the weights protrude no more than 5 meters down from the transport wire when being attached thereto.

7. The system of claim 1, wherein:
   the weights do not comprise any seat or a pulling device for a human sitting or standing on skis.

8. The system of claim 1, wherein:
the first and/or the second station is arranged to store the weights disconnected from the transport wire of said ropeway.

9. The system of claim 8, wherein:
the storing of the weights at said first and/or said second station is such that the weights are arranged to occupy at least 50% of a total storing volume defined by an envelope surface of the outer-most weights.

10. The system of claim 1, wherein:
the storing space is a vertical storage space, arranged to store weights in several stories.

11. The system of claim 1, wherein:
the first station and/or the second station comprises a weight deceleration mechanism, comprising a local uphill part arranged to raise a weight as the weight passes the uphill part, the uphill part being arranged to slow a velocity of the weight to at most 1 m/s using only the increased gravitational potential energy of the weight as deceleration mechanism.

12. The system of claim 11, wherein:
the uphill part is adjustable, so that a total distance that the weight is raised as the weight passes the uphill part is adjusted depending on an incoming velocity of the weight towards the uphill part.

13. The system of claim 1, wherein:
the system comprises a plurality of gripping devices, arranged on individual weights and/or on the transport wire, and arranged to detachably fasten the weights to said transport wire.

14. The system of claim 13, wherein:
a respective gripping mechanism of each of said gripping devices is spring-loaded in two different directions, away from an unstable state, so that the gripping mechanism moves into stable engagement with the wire in question and so that the gripping mechanism moves to a stable resting state not in engagement with the wire in question in the other direction.

15. The system of claim 13, wherein:
each gripping device is attached to, and move with, the transport wire.

16. The system of claim 15, wherein:
the gripping device are arranged to be heated.

17. The system of claim 1, wherein:
the electric motor is a DC motor, an AC motor or an asynchronous AC motor, and/or
the electric generator is a DC generator, an AC generator or an asynchronous AC generator.

18. The system of claim 1, wherein:
the ropeway is arranged to be driven in a first direction to transport weights from the first station to the second station and in a second direction to transport weights from the second station to the first station, and/or
the transport wire is an endless wire, wherein the ropeway is arranged to be driven in the same direction to transport the weights from the first station to the second station as transporting the weights from the second station to the first station.

19. The system of claim 1, wherein:
the system is connected to an electric power grid, and wherein
the system comprises an electric battery connected to the ropeway, the battery being arranged to receive and provide electric energy from and to the ropeway, the battery further being arranged to receive and provide electric energy from and to the electric power grid.

20. A method for storing energy in the form of gravitational potential energy, the method comprising:
a first provisioning step, wherein a plurality of weights are provided, attached to a transport wire of a ropeway at a first station;
a first energy conversion step, wherein an electric motor is used to transform available electric energy into potential energy, by displacing said plurality of weights, the weights being conveyed along said ropeway along the ground from said first station to a second station, the second station being located higher than the first station, the ropeway being driven by said electric motor and transporting said weights from said first station to said second station;
an energy storing step, wherein said weights are disconnected from the transport wire by a weight handling mechanism, transported to and held at a storing space of said second station for a time period, transported back to the transport wire, and reconnected to the transport wire; and
a second energy conversion step, wherein said gravitational potential energy is transformed into electric energy by allowing said weights to move in the gravitational field, while being conveyed along said ropeway from the second station towards the first station, the potential energy being transformed into electric energy, using an electric generator loaded by the weights.

* * * * *